United States Patent
Egedal et al.

(10) Patent No.: US 9,790,921 B2
(45) Date of Patent: Oct. 17, 2017

(54) METHOD AND SYSTEM FOR ADJUSTING A POWER PARAMETER OF A WIND TURBINE

(75) Inventors: Per Egedal, Herning (DK); Rune Rubak, Silkeborg (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 607 days.

(21) Appl. No.: 13/248,073

(22) Filed: Sep. 29, 2011

(65) Prior Publication Data
US 2012/0091713 A1  Apr. 19, 2012

(30) Foreign Application Priority Data
Oct. 19, 2010  (EP) .................................... 10188030

(51) Int. Cl.
*H02P 9/04* (2006.01)
*F03D 7/02* (2006.01)
*F03D 7/04* (2006.01)

(52) U.S. Cl.
CPC ........... *F03D 7/0224* (2013.01); *F03D 7/028* (2013.01); *F03D 7/042* (2013.01); *F05B 2260/71* (2013.01); *F05B 2260/84* (2013.01); *F05B 2270/101* (2013.01); *F05B 2270/109* (2013.01); *F05B 2270/1033* (2013.01); *F05B 2270/1095* (2013.01); *F05B 2270/322* (2013.01); *F05B 2270/327* (2013.01); *F05B 2270/331* (2013.01); *Y02E 10/723* (2013.01)

(58) Field of Classification Search
CPC ........ F03D 7/00; F03D 7/0272; F03D 7/0276; F03D 7/0224; F03D 7/028; F03D 7/042; Y02E 10/723
USPC ..................................................... 290/44, 55
See application file for complete search history.

(56) References Cited

U.S. PATENT DOCUMENTS

| | | | | |
|---|---|---|---|---|
| 5,289,041 | A * | 2/1994 | Holley | 290/44 |
| 2003/0127862 | A1 | 7/2003 | Weitkamp | |
| 2003/0151259 | A1* | 8/2003 | Feddersen et al. | 290/44 |
| 2003/0160457 | A1 | 8/2003 | Ragwitz et al. | |
| 2007/0018457 | A1 | 1/2007 | Llorente Gonzalez | |
| 2009/0206605 | A1* | 8/2009 | Schmidt | 290/44 |
| 2009/0241659 | A1* | 10/2009 | Yoshida et al. | 73/170.07 |

FOREIGN PATENT DOCUMENTS

| | | |
|---|---|---|
| CN | 1900513 A | 1/2007 |
| CN | 101680426 A | 3/2010 |
| CN | 101688519 A | 3/2010 |
| EP | 1132614 A2 | 9/2001 |
| EP | 2150699 B1 | 2/2010 |
| WO | WO 2008131776 A2 | 11/2008 |

* cited by examiner

Primary Examiner — Viet Nguyen

(57) ABSTRACT

A method for adjusting a power parameter of a wind turbine is disclosed. The method includes determining a load parameter indicative of a mechanical load of the wind turbine; estimating a turbulence of a wind speed based on the determined load parameter; and adjusting the power parameter relating to a power of the wind turbine based on the estimated turbulence. A system for adjusting a power parameter of a wind turbine is also described.

16 Claims, 4 Drawing Sheets

METHOD AND SYSTEM FOR ADJUSTING A POWER PARAMETER OF A WIND TURBINE

CROSS REFERENCE TO RELATED APPLICATIONS

This application claims priority of European Patent Office application No. 10188030.0 EP filed Oct. 19, 2011, which is incorporated by reference herein in its entirety.

FIELD OF INVENTION

The present invention relates to a method and to a system for adjusting a power parameter of a wind turbine. In particular, the present invention relates to a method and to a system for adjusting a power parameter of a wind turbine, wherein a turbulence of wind or of a wind speed is taken into account for optimally adjusting the power parameter relating to a power of the wind turbine.

ART BACKGROUND

A conventional wind turbine comprises a wind turbine tower, a nacelle, a hub connected to the nacelle and one or more rotor blades connected to the hub. Moving air, i.e. wind, impacting onto the one or more rotor blades transfers a part of its kinetic energy to the rotor blades to cause rotation of the rotor blades coupled to a rotor shaft around a rotation axis. The rotor shaft is coupled to an electric generator to generate electric energy, when the rotor shaft is rotating. Depending on a rotor speed, a pitch angle of the one or more rotor blades, and other operation parameters the generator outputs a particular electrical power. Further, depending on a wind condition, an operating condition of the wind turbine and external parameters the wind turbine may be subjected to a particular mechanical load which may limit the lifetime of the wind turbine. It may be known that the mechanical load of the wind turbine increases with increasing wind velocity and e.g. with increasing rotor speed. Further, the mechanical load of the wind turbine may depend on a pitch angle of the rotor blades.

There may be a need for a method and a system for adjusting a power parameter of a wind turbine which allows an operation of a wind turbine under differing operating conditions, in particular at changing wind conditions. Further, there may be a need for a method and a system for a power parameter of a wind turbine, wherein the mechanical load of the wind turbine is properly adjusted to ensure a prolonged lifetime of the wind turbine.

SUMMARY OF THE INVENTION

This need may be met by the subject matter according to the independent claims. Advantageous embodiments of the present invention are described by the dependent claims.

According to an embodiment a method for adjusting a power parameter of a wind turbine is provided, wherein the method comprises determining (in particular comprising measuring, deriving, computing, storing, retrieving, detecting, sensing, transferring, and/or verifying) a load parameter (representing a physical quantity) indicative of a mechanical load (such as an impact, a force, a mechanical charge, a wear) of the wind turbine; and adjusting (in particular comprising controlling, increasing, decreasing, varying, changing, and/or optimizing) the power parameter (any parameter that is dependent on or affects a power of the wind turbine, such as a power output, a rotor speed of the wind turbine, and/or a blade pitch angle of a blade of the wind turbine) relating to a power (in particular an electric power output) of the wind turbine based on the load parameter.

According to an embodiment the method further comprises estimating (in particular comprising deriving, computing, predicting and/or simulating) a turbulence (being in particular a standard deviation of a wind speed divided by an average wind speed, wherein the standard deviation of the wind speed and also the average wind speed is taken as a standard deviation over time and average over time, respectively; the turbulence being in particular indicative of a variation of the wind speed over time) of a wind speed based on the determined load parameter (i.e. the turbulence in particular is dependent on the determined load parameter or the turbulence may be derived from or simulated using the determined load parameter), wherein the adjusting the power parameter is based on the estimated turbulence.

Thus, the estimated turbulence (in particular representing a time variation of a wind speed) is taken into account for adjusting the power parameter. Thereby it is enabled, to optimally control the power parameter under conditions of the wind turbine changing over time. In particular, the mechanical load acting on the wind turbine may increase when the wind turbulence is increasing. However, in a conventional system the turbine power curve is usually only guaranteed at a low turbulence level. Thus, for increasing the power output or maintaining the power output at a reasonable level also at a high wind turbulence, it is necessary to control the power parameter appropriately.

In a conventional system the wind turbine may be designed to the load level at a high turbulence and power optimal setting.

According to an embodiment optimal settings for power and pitch angle of the rotor blade may be adjusted such that the mechanical load is reduced, in particular at high wind turbulence. According to an embodiment the turbulence may be directly calculated as a function of a measured wind speed or it may also be estimated as a function of other signals, e.g. the rotor speed. Instead of the turbulence another feature, which is increasing when the turbine loads are increased could also be used. It could e.g. be the deviation in rotor speed, or vibration in the structure of the turbine.

According to an embodiment the power parameter is adjusted such that the mechanical load of the wind turbine is maintained below a threshold load. Thereby, it may be ensured that the wind turbine is not damaged, even at high wind turbulence. In particular, the power parameter may be adjusted in order to influence a rotor speed and/or a wind impact.

According to an embodiment the power parameter is adjusted such that the power of the wind turbine is optimized. In particular, the power output of the wind turbine (in particular output from an electric generator) may be controlled depending on the load parameter and/or the estimated turbulence to gain a maximal power from the wind turbine. In particular, the power gain from the wind turbine may be higher than without taking into account the load parameter and/or the wind turbulence.

According to an embodiment the determining the load parameter comprises measuring a wind speed (in particular using a wind sensor at one or more locations of the wind turbine) and/or measuring a rotor speed (in particular by using one or more speed sensors) of a rotor of the wind turbine. In particular, the wind speed and/or the rotor speed may be measured over one or more time points (i.e. measured depending on the time). From the plural measurement values of the wind speed and/or the rotor speed a time course of the wind speed and/or the rotor speed may be derived. Further, a standard deviation of the wind speed and/or the rotor speed and/or an average (time average) of the wind speed and/or the rotor speed may be computed or determined. In particular, the turbulence may be derived as a ratio of the standard deviation of the wind speed and the average wind speed. In particular, the turbulence may be proportional to the mechanical load. Thus, the mechanical load of the wind turbine may be the higher the larger the variation of the wind speed is. Thereby, the load parameter may be derived in a simple manner.

According to an embodiment the adjusting the power parameter comprises adjusting a power output of a generator of the wind turbine. In particular, the power output of the generator may be determined as a product of a voltage and a current output from the generator. In particular, the higher the current drawn from the generator, the higher the breaking function of the generator may be for breaking (decelerating) the rotor. Thus, when a large current (large power) is drawn from the generator, the rotor speed may be smaller than when a small current (small power) is drawn from the generator of the wind turbine. In particular, the power output of the generator may be adjusted such that the power output is maximized. At the same time, the mechanical load may be below a threshold load in order not to damage the wind turbine.

According to an embodiment the adjusting the power output comprises adjusting a rotor speed of the wind turbine. Besides controlling a current and/or voltage and/or power drawn from the generator the rotor speed may be adjusted by adjusting an orientation of the one or more rotor blades connected to the rotor and/or by adjusting an (in particular vertical) orientation of the entire turbine tower. Further, the rotor speed may be adjusted to maximize the electrical power output and/or to minimize the mechanical load or to at least maintain the mechanical load below the threshold load.

According to an embodiment the method for adjusting a power parameter of a wind turbine further comprises simulating (in particular by an offline simulation, in particular involving a numerical solution of a mathematical physical model) a dependency of the load of the turbine from the rotor speed and/or simulating a dependency of the power of the turbine from the rotor speed. In particular, by simulating the dependency or the dependencies the adjusting the power parameter may be improved, in order to maximize the power output and/or to minimize the load or to at least maintain the mechanical load below the load threshold.

According to an embodiment the rotor speed is increased when the load of the wind turbine increases. In particular, the rotor may be decelerated or slowed down to a lesser degree when the load of the wind turbine increases. In particular, a power and/or voltage and/or current drawn from the generator of the wind turbine may be lower, when the load of the wind turbine (or wind turbulence) increases. Thereby, the load of the wind turbine may be maintained below the threshold load. Thereby, the lifetime of the wind turbine may be increased.

According to an embodiment the power output decreases when the load of the wind turbine increases. In particular, decreasing the power output may tend to decrease the load to which the wind turbine is subjected. Thereby, the lifetime of the wind turbine may be prolonged.

According to an embodiment the adjusting the power output comprises adjusting a blade pitch angle of a rotor blade of the wind turbine. The blade pitch angle may be defined as a pivoting or rotation angle of a blade along a longitudinal axis of the blade. In operation the blade rotates within a rotor plane perpendicular to the rotor axis. A blade pitch angle of 0° may correspond to an orientation of the blade, wherein the main surfaces of the blade substantially are located within the rotor plane. In particular, the blade pitch angle 0 may represent a situation, where a highest resistance to the wind is established. By increasing the blade pitch angle the resistance of the blade may decrease. At a blade pitch angle of 90° the blade may have reached a so-called "stop position", wherein the resistance of the blade to the wind may be minimal. In particular, in the "stop position" the wind turbine blade may not be driven by the impacting wind (propagating along the rotation axis of the rotor shaft perpendicular to the rotor plane). A production state of the wind turbine blade may exhibit a blade pitch angle between 0° (at very low wind speeds) to 25° (at very high wind speeds). In particular, the blade pitch angle may be adjusted to increase with the wind speed in a region above about 10 m/s of wind speed.

According to an embodiment the method for adjusting a power parameter of a wind turbine further comprises simulating (involving numerical computation of a mathematical/physical model) a dependency of the mechanical load of the turbine from the blade pitch angle and/or simulating a dependency of the power of the turbine from the blade pitch angle. Thereby, the optimization of the power output and/or appropriate adjusting the load may be simplified.

According to an embodiment the blade pitch angle is changed towards a stop position of the rotor blade when the load of the wind turbine increases. Thereby, changing the blade pitch angle towards a stop position may involve increasing the blade pitch angle, thereby decreasing the resistance of the rotor blade. Thus in turn may decrease the load the blade is subjected to.

According to an embodiment a system for adjusting a power parameter of a wind turbine is provided, wherein the system comprises a module (in particular including one or more sensors or detectors, a processing system, a storage system, a control system) for determining a load parameter indicative of a mechanical load of the wind turbine; and a controller for adjusting the power parameter relating to a power of the wind turbine based on the load parameter According to an embodiment the system comprises a module (in particular comprising processing means and/or simulating means) for estimating a turbulence of a wind speed based on the determined load parameter, wherein the controller is adapted to adjust the power parameter based on the estimated turbulence.

It should be understood that features (individual or in any combination) which have been disclosed, described, or mentioned with respect to the method for adjusting a power parameter of a wind turbine may also be applied (individually or in any combination) to the system for adjusting a power parameter of a wind turbine. Further, according to an embodiment a wind turbine is provided comprising the system for adjusting a power parameter of the wind turbine.

According to an embodiment the optimum power and/or pitch curve(s) may be adjusted as a function of increasing loads or some indicators for increasing loads, e.g. the wind turbulence.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings. In the drawings components or elements similar in structure and/or function care designated with like reference symbols differing only in the first digit.

DETAILED DESCRIPTION

Figure 1:
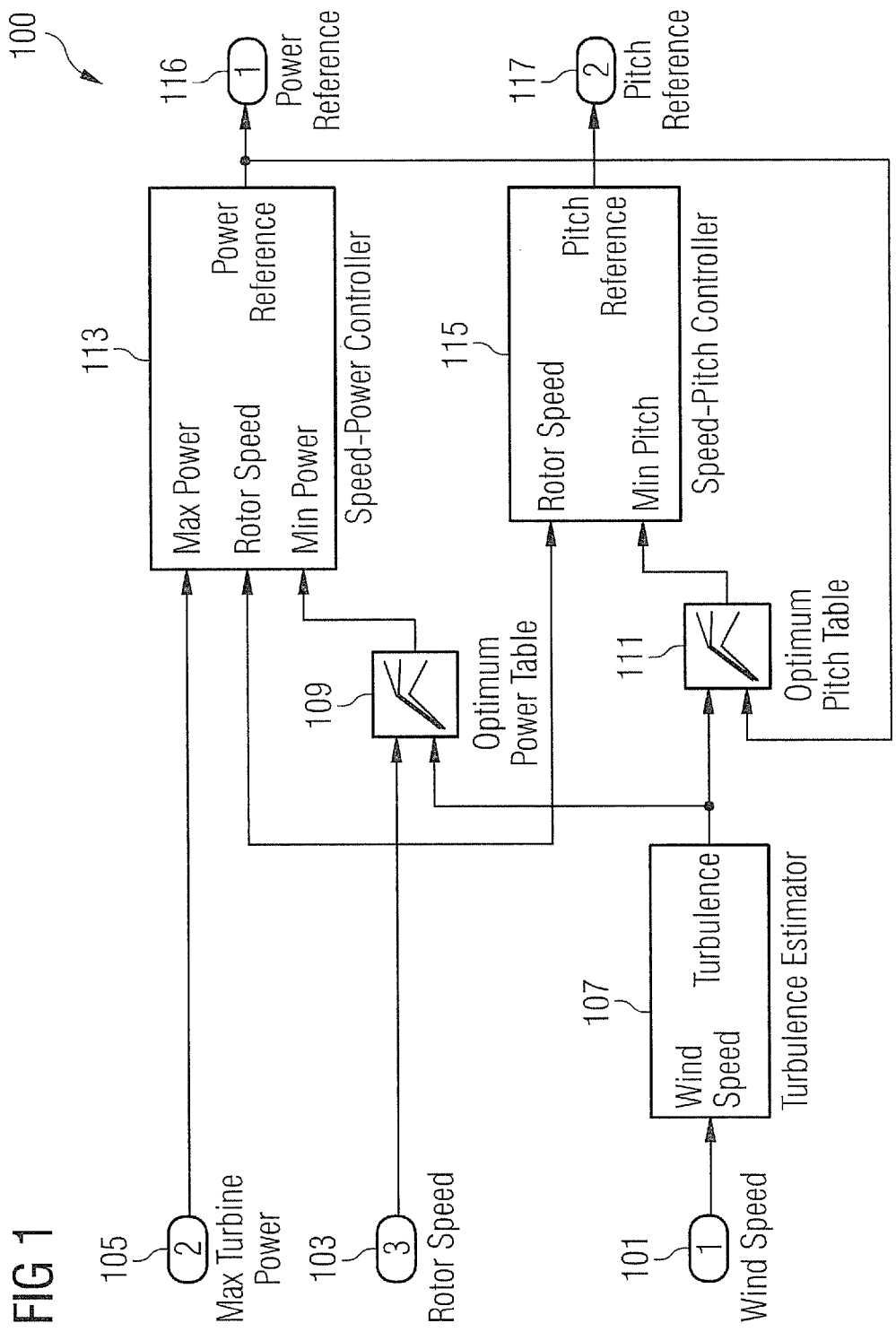
FIG. 1 schematically illustrates a system for adjusting a power parameter of a wind turbine according to an embodiment.

The illustration in the drawing is schematically. It is noted that in different figures, similar or identical elements are provided with the same reference signs or with reference signs, which are different from the corresponding reference signs only within the first digit.

FIG. 1 schematically illustrates a system for adjusting a power parameter of a wind turbine according to an embodiment. The system 100 comprises a wind speed sensor 101 for measuring the wind speed at one or more positions close to or at the wind turbine. Further, the system 100 comprises a rotor speed sensor 103 for measuring the rotor speed of the wind turbine. Further, the system 100 comprises a data storage 105 comprising a value for the maximal turbine power.

The measured wind speed measured by the wind speed sensor 101 is supplied to a module 107 for estimating a turbulence of a wind speed (also referred to as turbulence estimator) which is adapted to derive a turbulence of the wind speed based on the wind speed supplied from the wind speed sensor 101. The turbulence derived by the module 107 may also be a measure for a mechanical load of the wind turbine.

The system 100 further comprises a lookup table 109 defining an optimum power depending on the rotor speed. Further, the system 100 comprises a lookup table or graph 111 defining or establishing a dependency of the optimum pitch angle depending on the generator power. Using the turbulence value estimated by the module 107 the lookup tables 109 and 111 are updated. Thus, the minimum pitch angle output from the lookup table 111 is changed in dependence of the turbulence supplied from the module 107. Further, the minimal power output from the lookup table 109 is adjusted or changed in dependence of the turbulence supplied from the module 107 to the lookup table 109. The minimal power supplied from the lookup table 109 is input into the power controller 113 which is adapted to derive a power reference based on the minimal power, the rotor speed and the maximum turbine power obtained from the storage 105.

Further, the minimum pitch is supplied to the pitch controller 115 which derives the pitch reference 117 based on the rotor speed and the minimal pitch. In particular, the power reference 116 obtained from the power controller 113 changes with changing turbulence estimated by the module 107. Further, the pitch reference 117 output from the pitch controller 115 changes with changing turbulence output from the module 107. In particular, the power reference 116 and the pitch reference 117 are adjusted such that the load of the wind turbine is below a threshold load and/or such that the power output from the wind turbine is maximized. Using the power reference 116 and the pitch reference 117 a wind turbine may be appropriately controlled by the system 100 for decreasing the load and/or for maximizing the power output.

Figure 2:
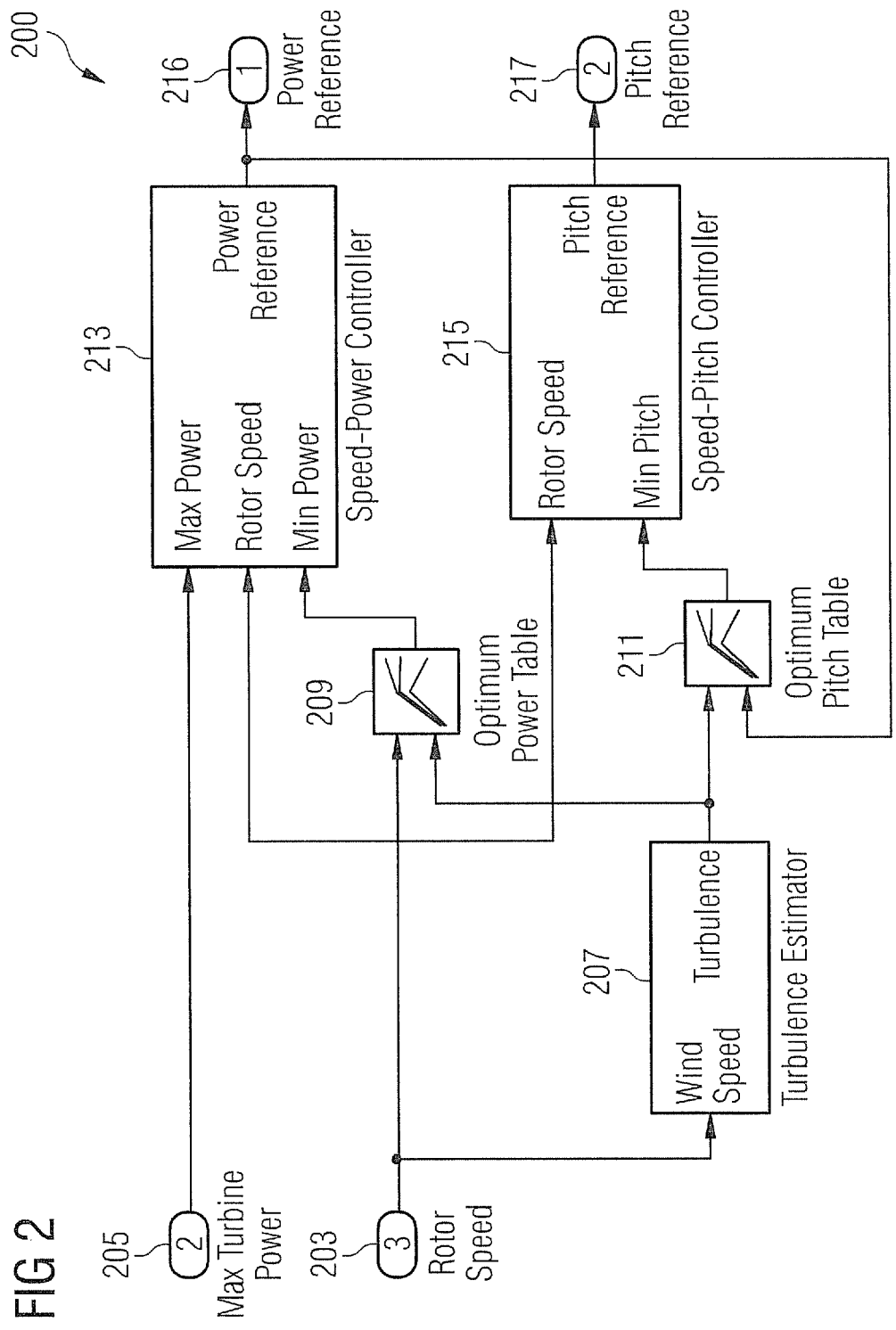
FIG. 2 schematically illustrates a system for adjusting a power parameter of a wind turbine according to another embodiment.

FIG. 2 schematically illustrates a system 200 for adjusting a power parameter of a wind turbine according to another embodiment. The system 200 illustrated in FIG. 2 has similarities with the system 100 illustrated in FIG. 1, but dispenses with the wind speed sensor 101. Further, the rotor speed (instead of the wind speed) measured by the rotor speed sensor 203 is supplied to the module 207 for estimating a turbulence (also referred to as turbulence estimator). From the rotor speed obtained from the rotor speed sensor 203 the turbulence estimator 207 estimates the wind turbulence. Again, the wind turbulence is supplied to the lookup table 209 (relating rotor speed to optimum power) and to the lookup table 211 (relating a power to an optimum pitch angle). In accordance with the supplied turbulence the lookup tables 209 and 211 are updated. Similarly as in the embodiment 100 illustrated in FIG. 1 the updated values of the lookup tables 209 and 211 are supplied to the power controller 213 and the pitch controller 215, respectively. The power controller 213 derives a power reference 216 from the maximum power derived from the data storage 205, the rotor speed and the minimum power obtained from the updated lookup table 209. Further, the pitch controller 215 generates the pitch reference 217 based on the rotor speed and the minimum pitch obtained from the updated lookup table 211. The power reference 216 and the pitch reference 217 may be supplied to a wind turbine, in order to control the wind turbine for reduced mechanical load and/or for maximized electrical power output.

Figure 3:
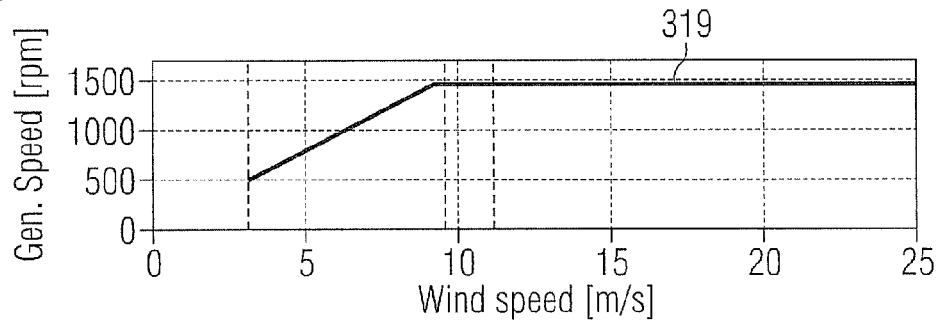
FIGS. 3-6 illustrate graphs showing dependencies of parameters related to a wind turbine depending on a wind speed.

FIGS. 3, 4, 5 and 6 illustrate graphs showing a dependency of a generator speed (FIG. 3), a pitch angle (FIG. 4), a power (FIG. 5), and a wind pdf (i.e. the probability distribution of the wind speed) (FIG. 6) in dependence of a wind speed. Thereby, an abscissa in the FIGS. 3, 4, 5 and 6 denotes the wind speed in m/s which may be measured by e.g. the wind speed sensor 101 illustrated in FIG. 1. Different wind speeds may be categorized into a first region 120 (comprising the wind speed range from about 3 m/s-9 m/s), a second region 122 (comprising wind speeds in the range between about 9 m/s and 11 m/s), and a third region 124 (comprising wind speeds in the range above about 11 m/s). As can be seen in FIG. 3 the generator speed 319 measured in rounds per minute (rpm) increases in the first region 120 from about 500 rpm-1500 rpm. In regions 2 and 3 (regions 122 and 124) the generator speed stays constant at about 1500 rpm.

Figure 4:
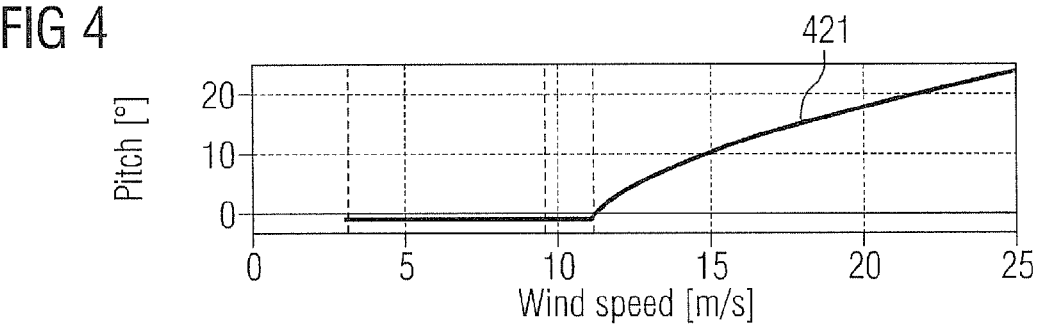

As can be seen from FIG. 4, the pitch angle 420 (the blade pitch angle of one or more rotor blades of the wind turbine) amounts to about 0° in the first region 120 and the second region 122. In contrast, in the third region 124 the pitch angle denoted by curve 420 increases from 0° to around 23° at very high wind speed.

Figure 5:
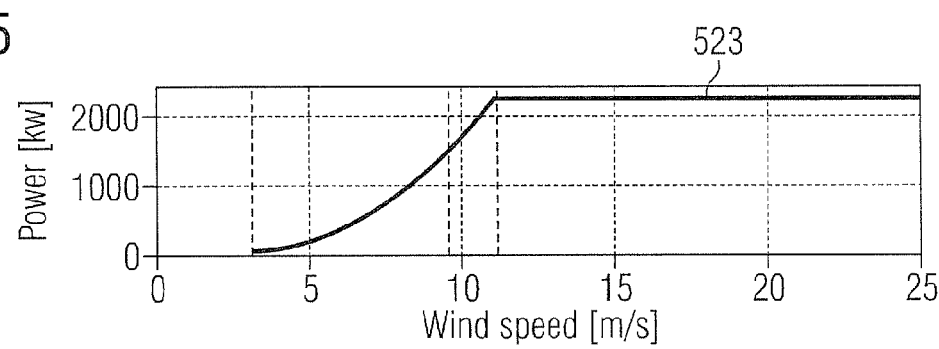

As can be seen from FIG. 5, the power (in particular power output of the wind turbine generator) increases in the first region 120 and the second region 122 according to an approximately quadratic behaviour and stays about constant at a value of about 2.2 kW in the third region 124.

Figure 6:
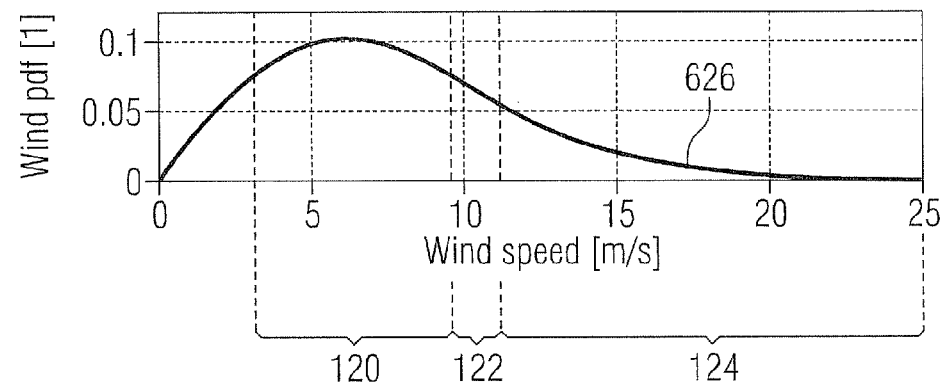

In FIG. 6 the probability distribution 626 of the wind speed (wind pdf) is depicted, to get an idea about how often the wind speed is e.g. 6 m/s (an approximate average of the wind speed) compared to e.g. 25 m/s. The wind pdf has a maximum in the first region indicating that the wind most probable has a speed in the first region 120. The probability is lower in the second region 122 and still lower in the third region 124.

Figure 7:
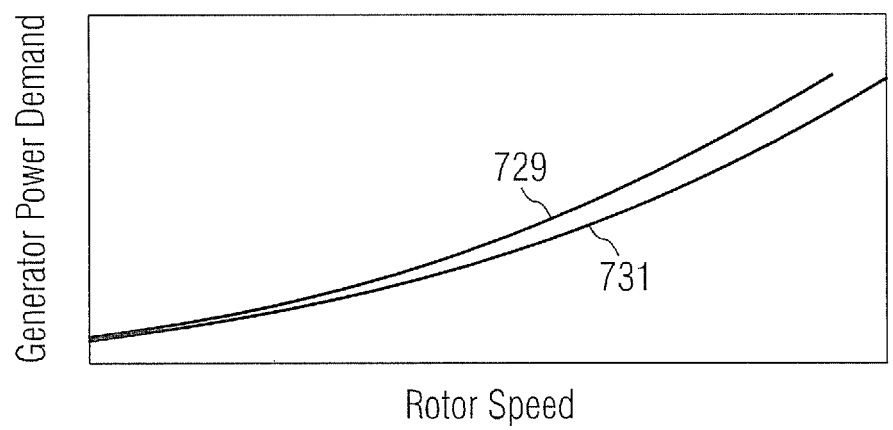
FIG. 7 illustrates a graph depicting a dependency of a generator power demand from a rotor speed according to an embodiment.

FIG. 7 illustrates a graph showing a dependency of the generator power demand from the rotor speed for different values of turbulences. On an abscissa the rotor speed is indicated, while on an ordinate the generator power demand is indicated. As a curve 729 the case of no turbulence is indicated, while as a curve 731 a case of very high turbulence is indicated. As can be seen from FIG. 7 the curve for a high turbulence (curve 731) lies below the curve 729 of no turbulence. Thus, at high turbulence the generator power demand is decreased relative to the case of no turbulence. Thereby, the mechanical load of the wind turbine may be decreased for increasing the lifetime of the wind turbine.

Figure 8:
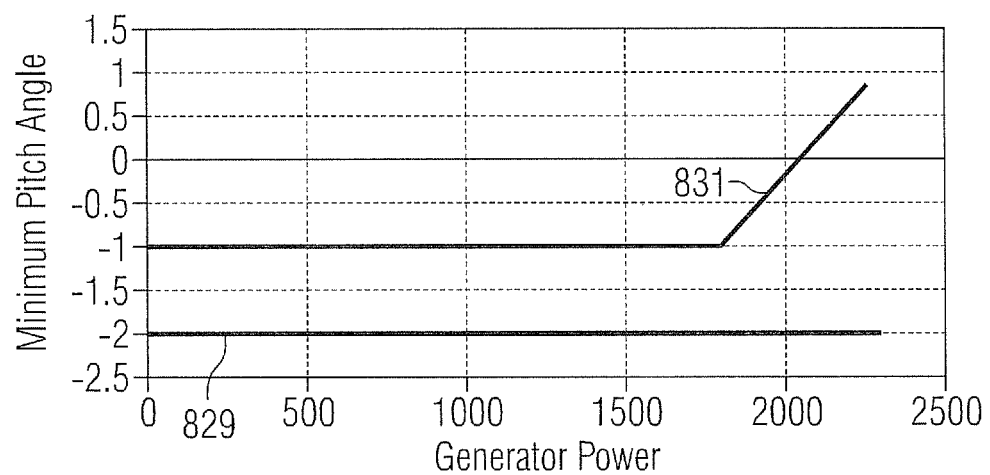
FIG. 8 illustrates a graph showing a dependency of a minimum blade pitch angle depending on a generator power.

FIG. 8 shows a graph depicting a dependency of the minimum pitch angle and the generator power for different degrees of turbulence. On an abscissa in FIG. 8 the generator power is indicated, while on an ordinate the minimum pitch angle (of a rotor blade) is indicated. A curve 829 illustrates the dependency for the case of no turbulence, while the curve 831 illustrates the case of a high turbulence. As can be taken from FIG. 8, the minimum pitch angle for high turbulence is higher than the minimum pitch angle for no turbulence. Since the higher the minimum pitch angle the lower the resistance of the blade, adjusting the pitch angle to a higher value at high turbulence may decrease the mechanical load of the wind turbine, thus prolonging the lifetime of the wind turbine. Further, the power output of the wind turbine may be maximized by appropriately adjusting the pitch angle (in particular minimum pitch angle) according to the FIG. 8.

In particular FIG. 7 may represent (in particular for the case of high turbulence) the lookup table 109 or 209 illustrated in FIG. 1 and FIG. 2, respectively and FIG. 8 may represent (in particular for the case of high turbulence) the lookup table 111 illustrated in FIG. 1 or the lookup table 211 illustrated in FIG. 2, according to an embodiment.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for adjusting an electrical power parameter of a wind turbine, the method comprising:

determining a load parameter indicative of a mechanical load of the wind turbine;

estimating a turbulence of a wind speed based on the determined load parameter;

updating a power lookup table defining a power of the wind turbine depending on the rotor speed, the power lookup table is updated by using the estimated turbulence;

adjusting the electrical power parameter based on the load parameter, the estimated turbulence and a minimal power supplied from the power lookup table.

2. The method according to claim 1, wherein the electrical power parameter is adjusted such that the mechanical load of the wind turbine is maintained below a threshold load.

3. The method according to claim 1, wherein the electrical power parameter is adjusted such that the electrical power of the wind turbine is optimized.

4. The method according to claim 1, wherein the determining the load parameter comprises measuring a wind speed or measuring a rotor speed of a rotor of the wind turbine.

5. The method according to claim 1, wherein the determining the load parameter comprises measuring a wind speed and measuring a rotor speed of a rotor of the wind turbine.

6. The method according to claim 1, wherein the adjusting the electrical power parameter comprises adjusting a electrical power output of a generator of the wind turbine.

7. The method according to claim 6, wherein adjusting the electrical power output comprises adjusting a rotor speed of the wind turbine.

8. The method according to claim 7, further comprising simulating a dependency of the mechanical load of the turbine from the rotor speed and simulating a dependency of the electrical power of the turbine from the rotor speed.

9. The method according to claim 7, further comprising simulating a dependency of the electrical power of the turbine from the rotor speed.

10. The method according to claim 7, wherein the rotor speed is increased when the mechanical load of the wind turbine increases.

11. The method according to claim 6, wherein the electrical power output decreases when the mechanical load of the wind turbine increases.

12. The method according to claim 6, wherein adjusting the electrical power output comprises adjusting a blade pitch angle of a rotor blade of the wind turbine, updating a pitch lookup table defining a dependency of an optimum pitch angle depending on the generator power, wherein the pitch lookup table is updated using the estimated turbulence, wherein the adjusting the pitch angle is based on a minimum pitch angle supplied from the lookup table.

13. The method according to claim 12, further comprising simulating a dependency of the mechanical load of the turbine from the blade pitch angle and/or simulating a dependency of the electrical power of the turbine from the blade pitch angle.

14. The method according to claim 12, wherein the blade pitch angle is changed towards a stop position of the rotor blade when the mechanical load of the wind turbine increases.

15. The method according to claim 1,
wherein the estimated turbulence is computed as the standard deviation of the wind speed divided by an average of the wind speed.

16. A system for adjusting an electrical power parameter of a wind turbine, the system comprising:
 a module configured for determining a load parameter indicative of a mechanical load of the wind turbine;
 a rotor speed sensor configured for detecting a rotor speed;
 a power lookup table defining a power of the wind turbine via a relationship between the rotor speed and an estimated turbulence, the estimated turbulence based on the determined load parameter, the power lookup table configured to receive the rotor speed and the estimated turbulence in order to update the power lookup table; and
 a controller configured for adjusting the electrical power parameter relating to an electrical power of the wind turbine based on the determined load parameter, the estimated turbulence and a minimal power supplied from the power lookup table.

\* \* \* \* \*